United States Patent
Fertik et al.

(10) Patent No.: US 9,165,061 B2
(45) Date of Patent: Oct. 20, 2015

(54) IDENTIFYING INFORMATION RELATED TO A PARTICULAR ENTITY FROM ELECTRONIC SOURCES, USING DIMENSIONAL REDUCTION AND QUANTUM CLUSTERING

(75) Inventors: Michael Benjamin Selkowe Fertik, Palo Alto, CA (US); Tony Scott, Sunnyvale, CA (US); Thomas Dignan, Mountain View, CA (US)

(73) Assignee: REPUTATION.COM, Redwood, CA (US)

( * ) Notice: Subject to any disclaimer, the term of this patent is extended or adjusted under 35 U.S.C. 154(b) by 300 days.

(21) Appl. No.: 13/587,562

(22) Filed: Aug. 16, 2012

(65) Prior Publication Data

US 2012/0321204 A1     Dec. 20, 2012

Related U.S. Application Data

(63) Continuation of application No. 13/164,641, filed on Jun. 20, 2011.

(51) Int. Cl.
*G06K 9/54*     (2006.01)
*G06F 17/30*    (2006.01)
*G06K 9/62*     (2006.01)

(52) U.S. Cl.
CPC .......... *G06F 17/3071* (2013.01); *G06K 9/6247* (2013.01)

(58) Field of Classification Search
CPC .......... G06F 17/3071; G06F 17/30705; G06F 17/30707; G06F 17/30713; G06F 17/30864; G06F 17/30675; G06T 7/0081
USPC .......... 382/305, 225, 229; 707/737, 706, 711, 707/741, 803, 811
See application file for complete search history.

(56) References Cited

U.S. PATENT DOCUMENTS

| | | | |
|---|---|---|---|
| 5,819,258 A * | 10/1998 | Vaithyanathan et al. | ..... 707/692 |
| 5,857,179 A | 1/1999 | Vaithyanathan et al. | |
| 6,611,825 B1 * | 8/2003 | Billheimer et al. | ............. 706/45 |
| 6,678,690 B2 | 1/2004 | Kobayashi et al. | |

(Continued)

OTHER PUBLICATIONS

Daranyi et al., Svensk Biblioteksforskning: Automated text categorization of bibliographic records [>Boras academic digital archive (BADA), article, peer reviewed< on-line], Hogskolan i Boras, vol. 16, Issue 2, pp. 1-14 as paginated or 16-29 as unpaginated of 47 pages, 2007 [retrieved on Nov. 6, 2012].*

PCT Notification of Transmittal of the International Search Report and the Written Opinion of the International Searching Authority for International Application No. PCT/US2012/043392, mailed Jan. 25, 2013, 10 pages.

(Continued)

*Primary Examiner* — Matthew Bella
*Assistant Examiner* — Dennis Rosario
(74) *Attorney, Agent, or Firm* — Finnegan, Henderson, Farabow, Garrett & Dunner LLP (57) ABSTRACT

Presented are systems and methods for identifying information about a particular entity including acquiring electronic documents having unstructured text, that are selected based on one or more search terms from a plurality of terms related to the particular entity. Tokenizing the acquired documents to form a data matrix and then calculating a plurality of eigenvectors, using the data matrix and the transpose of the data matrix. The variance is then acquired for determining the amount of intra-clustering between the documents and then the acquired documents are clustered using some of the eigenvectors and the variance.

27 Claims, 9 Drawing Sheets

(56) References Cited

U.S. PATENT DOCUMENTS

| | | | |
|---|---|---|---|
| 6,775,677 | B1 | 8/2004 | Ando et al. |
| 7,028,026 | B1 | 4/2006 | Yang et al. |
| 7,653,646 | B2* | 1/2010 | Horn et al. ............. 707/999.102 |
| 7,792,816 | B2 | 9/2010 | Funes et al. |
| 7,970,872 | B2* | 6/2011 | Liu et al. ........................ 709/220 |
| 8,185,531 | B2* | 5/2012 | Nakano ......................... 707/737 |
| 2004/0078363 | A1 | 4/2004 | Kawatani |
| 2004/0088308 | A1* | 5/2004 | Bailey et al. .................. 707/100 |
| 2010/0198839 | A1 | 8/2010 | Basu et al. |
| 2010/0250515 | A1 | 9/2010 | Ozonat et al. |
| 2011/0016118 | A1* | 1/2011 | Edala et al. ................... 707/730 |

OTHER PUBLICATIONS

Office Action issued from the USPTO in a related U.S. Appl. No. 13/587,520, dated Aug. 2, 2013 (14 pages).
Office Action issued from the USPTO in a related U.S. Appl. No. 13/587,520, dated Apr. 16, 2013 (10 pages).
Office Action issued from the USPTO in a related U.S. Appl. No. 13/587,520, dated Jan. 11, 2013 (8 pages).
Office Action issued from the USPTO in a related U.S. Appl. No. 13/587,520, dated Sep. 21, 2012 (9 pages).

* cited by examiner

$$Q_{ij} = \begin{pmatrix} 1 & 0 & 0 & 1 & \cdots & Q_{1,n} \\ 0 & & & & & \\ 1 & & & & & \\ \vdots & & & & & \\ Q_{k,1} & & & & & Q_{k,n} \end{pmatrix} \quad i=[1..k]$$

$$j=[1..n], \quad n \gg k$$

IDENTIFYING INFORMATION RELATED TO A PARTICULAR ENTITY FROM ELECTRONIC SOURCES, USING DIMENSIONAL REDUCTION AND QUANTUM CLUSTERING

CROSS-REFERENCE TO RELATED APPLICATION

This application is a continuation of U.S. application Ser. No. 13/164,641, filed Jun. 20, 2011, which is incorporated in its entirety by this reference thereto.

DESCRIPTION

Background

Since the early 1990's, the number of people using the World Wide Web and the Internet has grown at a substantial rate. As more users take advantage of the services available on the Internet by registering on websites, posting comments and information electronically, or simply interacting with companies that post information about others (such as online newspapers), more and more information about the users is available. There is also a substantial amount of information available in publicly and privately available databases, such as LEXISNEXIS. Sending a query to the one or more of the above resources, using the name of a person or entity and other identifying information, may return highly dimensional data sets that occupy large amounts of memory. The large data sets may consume excessive system resources to process or may even be large enough that it is not feasible to contain the data set in virtual memory.

Additionally, there can be many "false positives" in the returned data set, because of the existence of other people or entities with the same name. False positives are search results that satisfy the query terms, but do not relate to the intended person or entity. The desired search results can also be buried or obfuscated by the abundance of false positives. Also, the desired search results may actually be shaped by the order of the resources searched.

To reduce the number of false positives, one may add additional search terms from known or learned biographical, geographical, and personal terms for the particular person or other entities. This can reduce the number of false positives received, but many relevant documents may be excluded.

Finally, some of the queried information resources may include unstructured data. Unstructured data typically does not have a pre-defined data model, and may not fit well into relational tables. Typically, unstructured data is text heavy, but may also contain dates, numbers, and other facts. This composition may be difficult to search using traditional computer programs, versus data tagged and stored in databases.

DESCRIPTION OF THE EMBODIMENTS

Reference will now be made in detail to the present exemplary embodiments, examples of which are illustrated in the accompanying drawings. Wherever possible, the same reference numbers will be used throughout the drawings to refer to the same or like parts.

Figure 1:
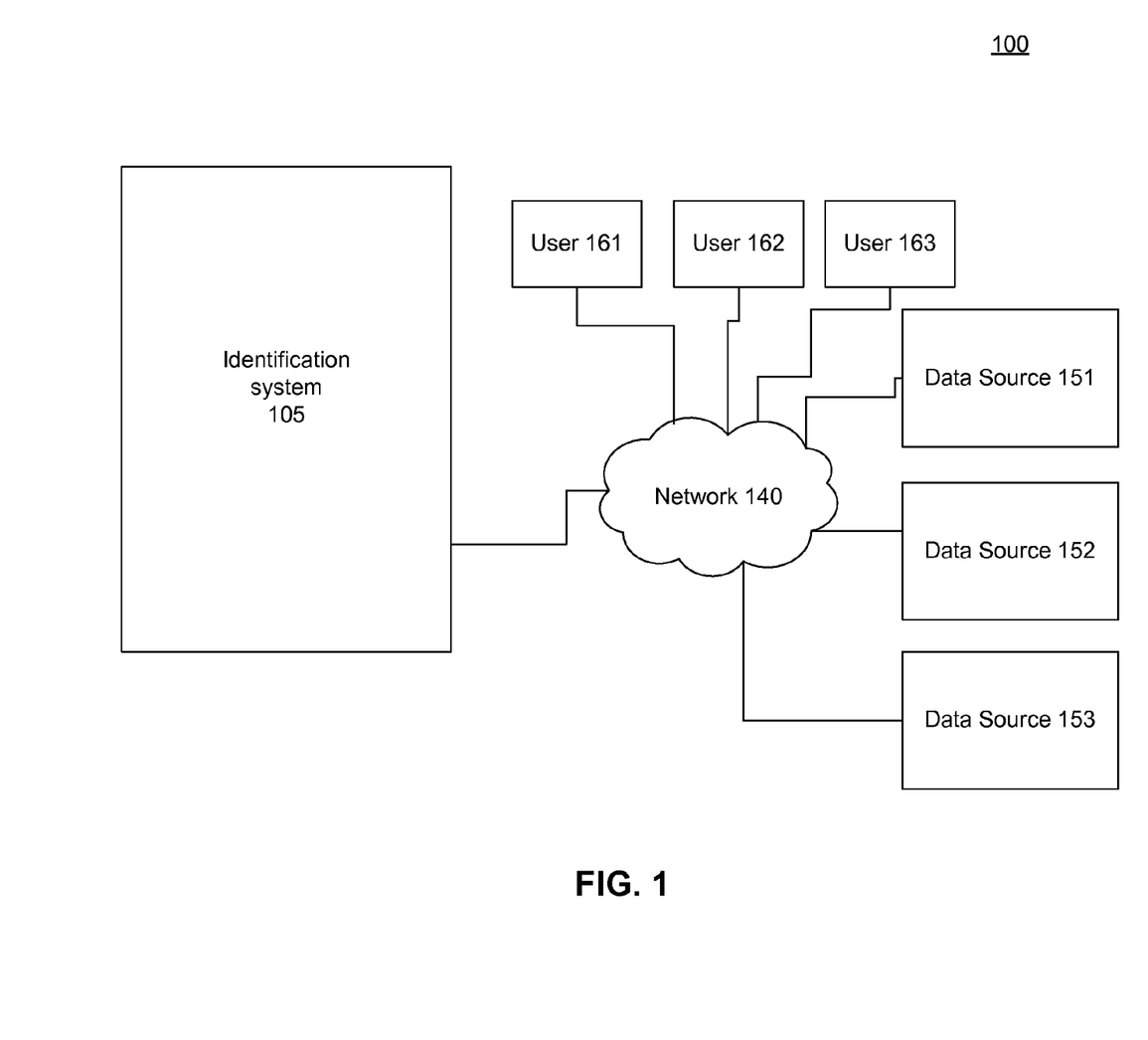
FIG. 1 is a block diagram depicting an exemplary system for identifying information related to a particular entity.

FIG. 1 is a block diagram depicting an example system 100 for analyzing information about a user. The system 100 may include users, 161, 162, and 163, data sources 151, 152, and 153, network 140, and identification device 105. System 100 may be configured to search unstructured data, which is data that does not fit well into a pre-defined data model. Structured data may be organized in a structure so that it is identifiable. For example, one form of structured data is a database like SQL™ or Microsoft Access™. SQL™ allows the selection of specific pieces of information based on columns and rows in a field, e.g., rows containing a particular date or ZIP code or name. Structured data is organized and searchable by data type within the actual content. In contrast, unstructured data has no identifiable structure. Examples of "unstructured data" may include books, journals, documents, metadata, health records, audio, video, log, files, and text such as the body of an e-mail message, Web page, or word processor document. Additionally, in some embodiments the system 100 may be configured to search biological and engineering data.

One or more users, e.g., users 161, 162, and 163 may be coupled to the identification system 105 via the network 140 or some other coupling. Users 161, 162, or 163 may, for example, have personal computers, personal data devices, telephones, or other devices coupled to identification system 105 via network 140. Additionally, in some embodiments (not shown) users may directly operate identification system 105 (e.g., the user's personal computer may embody the identification system 105). While portions of the specification may only refer to user 161 and not user 162 nor 163, this has been used for simplification purposes only and, unless noted otherwise, is not meant to limit the described embodiments in any way.

Data sources 151, 152, and 153 may be proprietary databases containing information about one or more users e.g., users 161, 162, or 163. Data sources 151, 152, and 153 may be "blogs" or websites, such as social networking websites or news agency websites. Data sources 151, 152, and 153 may be private party websites, company websites, or cached information stored in a search database, such as those maintained at Google™ or Yahoo™ Data sources 151, 152, and 153 may be a criminal database or listing, a credit agency data source, an insurance database, or any electronic or other source of information about any user 161, 162, or 163. There may be any number of data sources e.g., data sources 151, 152, and 153. While portions of the specification may only refer to data source 151 and not data sources 152 nor 153, this has been used for simplification purposes only and, unless noted otherwise, is not meant to limit the described embodiments in any way. The documents resulting from the search may relate to a person, organization, or other entity and may include web pages, emails, Microsoft Word™ documents, plain text files, encoded documents, or any other appropriate form of unstructured electronic information.

Network 140 may be, for example, the Internet, an intranet, a local area network, a wide area network, a campus area network, a metropolitan area network, an extranet, a private extranet, any set of two or more coupled electronic devices, or a combination of any of these or other appropriate networks.

Identification system 105 may include one or more processors (not shown), a memory (not shown), and a data interface (not shown). The processor(s) may be a single or multiple microprocessors, field programmable gate arrays (FPGAs), or digital signal processors (DSPs) capable of executing particular sets of instructions. Computer-readable instructions may be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods may be implemented in hardware components or combinations of hardware and software such as, for example, ASICs, special purpose computers, or general purpose computers. Identification system 105 may be implemented on a single computer, or may be distributed across a plurality of computers. Identification system 105 may be coupled to multiple data sources, for example, data sources 151, 152, and 153 either via network 140 or via other coupling.

Figure 2:
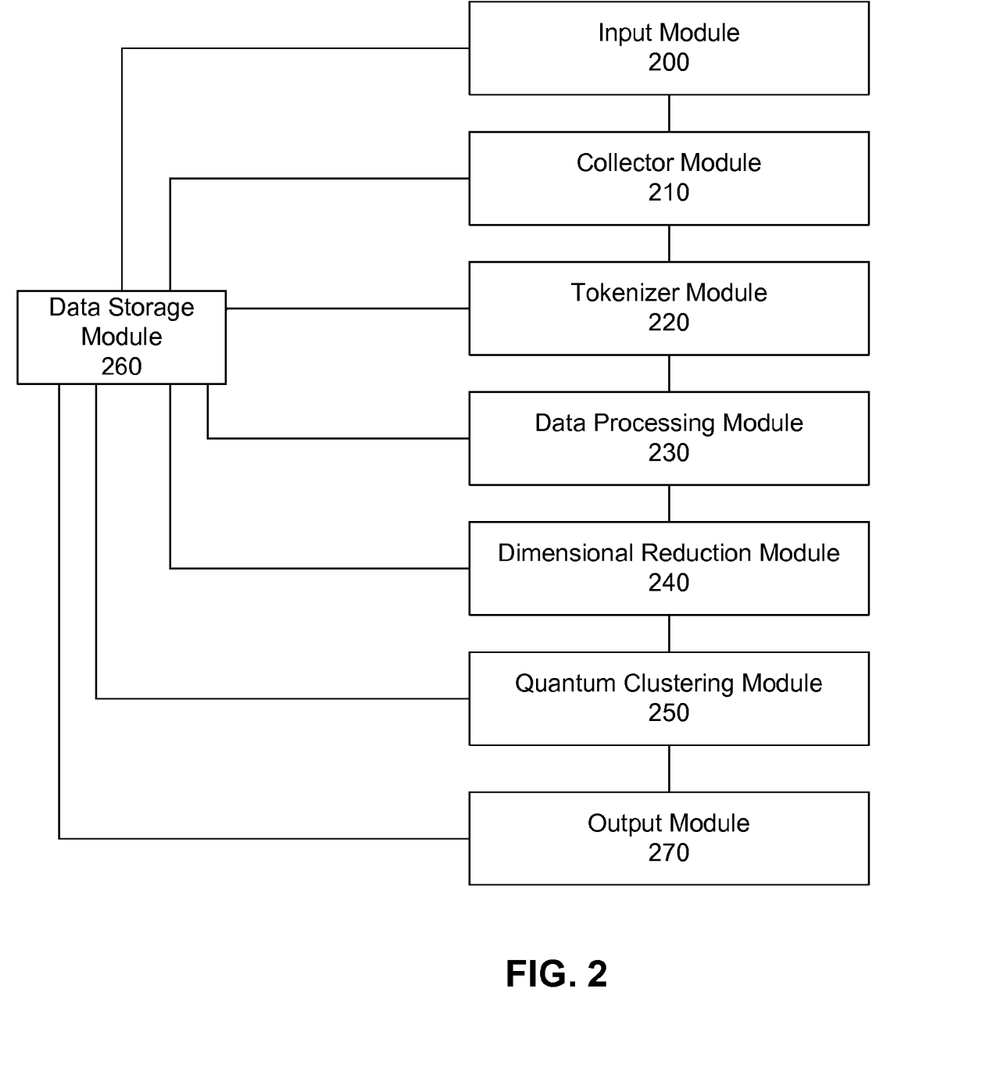
FIG. 2 is a block diagram depicting exemplary identification system 105.

FIG. 2 is a block diagram depicting exemplary identification system 105. Identification system 105 may include an input module 200, a collector module 210, a tokenizer module 220, a data processing module 230, a dimensional reduction module 240, a quantum clustering module 250, a data storage module 260, and an output module 270.

Input module 200 is a hardware interface, a software program, or a combination thereof configured to receive data from the network, for example data from one or more users 161-163 or one or more data sources 151-153. Input module 200 can be configured to store the received user information in data storage module 260. Input module 200 may include an Internet web server, such as Apache Tomcat™, Microsoft's Internet Information Services™, or Sun's Java System Web Server™. In some embodiments, input module 200 is combined with output module 270.

Collector module 210 is a hardware component, a software program, or a combination thereof configured to formulate searches using the user information. Additionally, the collector module 210 may be configured to prepare queries to send to one or more data sources 151, 152, and 153. Collector module 210 can work with output module 270 for sending the queries to one or more data sources 151-153. Collector module 210 may be configured to receive electronic information related to the target of the search from data sources 151, 152, and 153. The collector module 210 may be coupled to the input module 200, the tokenizer module 220, the data storage module 260, and output module 270.

Tokenizer module 220 is a hardware component, a software program, or a combination thereof configured to tokenize the received electronic documents creating a data matrix, Q. From the electronic information, tokenizer 220 can break a stream of text up into tokens (e.g., each token representing a word, a phrase, or a symbol), which are used to populate the Q data matrix. Tokenizer 220 can provide the Q data matrix to data processing module 230. In some embodiments, tokenizer module 220 is combined with data processing module 230. Tokenizer module 220 may be coupled to the collector module 210, the data storage module 260, and the data processing module 230.

Data processing module 230 is a hardware component, a software program, or a combination thereof configured to process the tokenized data matrix, Q, to determine the eigenvectors and corresponding eigenvalues (eigenvector-value pairs) for the matrix S, where $S=Q*Q^T$. Data processing module 230 may be coupled to tokenizer module 220, data storage module 260, and dimensional reduction module 240.

Additionally, in some embodiments not shown, data processing module 230 may be coupled to one or more slave servers. Where each slave server maintains a portion of the data matrix Q. Data processing module 230 may be configured to calculate the eigenvectors using the matrix-vector operations performed on each slave server.

Figure 5:
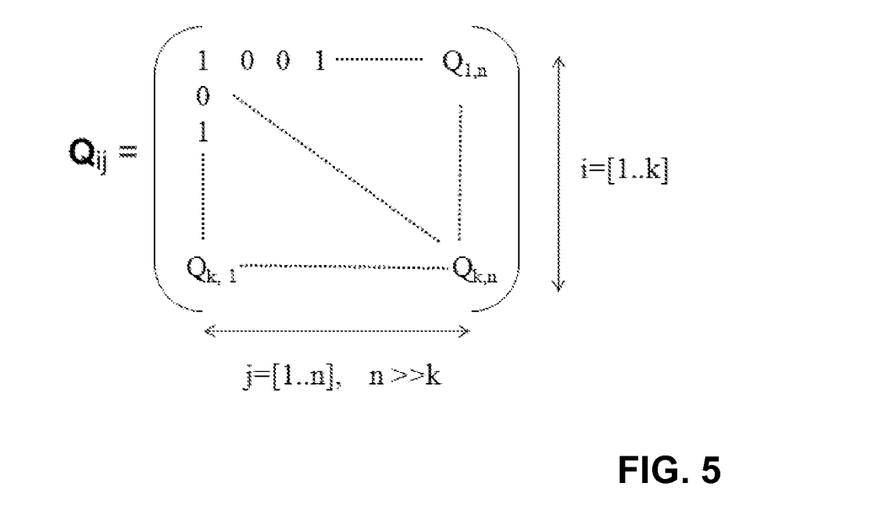
FIG. 5 is an example output data matrix Q.

Dimensional reduction module 240 is a hardware component, a software program, or a combination thereof configured to receive a threshold setting and apply the threshold setting to determine the lead eigenvectors that will be passed to quantum clustering module 250. The threshold setting is discussed in detail below with respect to FIG. 5. Threshold setting can be a stored preconfigured threshold setting or can be provided by an operator or the requesting user. In some embodiments, the threshold setting may be determined by dimensional reduction module 240 or data processing module 230 based on the eigenvectors calculated by data processing module 230. Dimensional reduction module 240 may be configured to reduce the size of the eigenvector-value data set, and provide the lead eigenvectors to quantum clustering module 250.

Quantum clustering module 250 is a hardware component, a software program, or a combination thereof configured to receive the reduced data set from the dimensional reduction module 240 and calculate clusters from the reduced data set. Quantum clustering module 250 may determine a variance used in calculating the clusters. The variance is used for setting the amount of clustering. In some embodiments, the requesting user may set or adjust the variance. Quantum clustering module 250 may create multiple clusters, which each contain information related to one or more documents. Quantum clustering module 250 may be coupled to dimensional reduction module 240, data storage module 260, and output module 270.

Data storage module 260 may comprise a random access memory (RAM), a read only memory (ROM), a programmable read-only memory (PROM), a field programmable read-only memory (FPROM), or other dynamic storage device for storing information and instructions to be used by input module 200, tokenizer module 210, collector module 220, data processing module 230, dimensional reduction module 240, quantum clustering module 250, and output module 270. For example, data storage module 260 may store data received by input module 200. Data storage module 260 may also include a database, one or more computer files in a directory structure, or any other appropriate data storage mechanism such as a memory. In some embodiments, data storage module 260 is distributed across a plurality of different data storage mechanisms.

Output module 270 may also be configured to transmit data, via network 140, from dimensional reduction module 240, the quantum clustering module 250, or the data storage module 260 to one or more users 161, 162, and 163. In some embodiments, output module 270 receives cluster information from cluster module 250 and outputs this information to the requesting user. As described below, this information may be displayed to the user through the user's access device. In some embodiments output module 270 may display the results to a human operator who may modify, correct, or alter the information, or to any other system or agent capable of interacting with the information, including an artificial intelligence system or agent (AI agent), before sending it to the user. In some embodiments, output module 270 may send the query generated by collector module 210 to the one or more data sources 151-153.

The coupling between modules, or between modules and network 140, may include, but is not limited to, electronic connections, coaxial cables, copper wire, and fiber optics, including the wires that comprise network 140. The coupling may also take the form of acoustic or light waves, such as lasers and those generated during radio-wave and infra-red data communications. Coupling may also be accomplished by communicating control information or data through one or more networks to other data devices. In some embodiments input module 200, collector module 210, tokenizer module 220, data processing module 230, dimensional reduction module 240, quantum clustering module 250, data storage module 260, and output module 270 may be coupled in a manner such that each module is logically connected to all of the other modules in information system 105.

Each of the logical or functional modules described above may comprise multiple modules. The modules may be implemented individually or their functions may be combined with the functions of other modules. Further, each of the modules may be implemented on individual components, or the modules may be implemented as a combination of components. For example, input module 110, collector module 210, tokenizer module 220, data processing module 230, dimensional reduction module 240, quantum clustering module 250, and output module 270 may each be implemented by a field-programmable gate array (FPGA), an application-specific integrated circuit (ASIC), a complex programmable logic device (CPLD), a printed circuit board (PCB), a combination of programmable logic components and programmable interconnects, single CPU chip, a CPU chip combined on a motherboard, a general purpose computer, or any other combination of devices or modules capable of performing the tasks of modules 200, 210, 220, 230, 240, 250, and 270.

Identification system 105 may use the information that identifies a user, for example, user 161, to construct one or more searches to find information about user 161. Identification system 105 then may search multiple data sources 151, 152, and 153 for information about user 161. Identification system 105 may be configured to receive any information found about user 161. Identification system 105 may also be configured to tokenize the information found about the user—to create a data set. The data set can be processed in a manner where the entire data set is not loaded into memory. Additionally, identification system 105 may be configured to perform a dimensional reduction on the data set. In some embodiments, information system 105 may be configured to perform quantum clustering on the dimensionally reduced processed data. In some embodiments, identification system 105 may then be configured to transmit the clustered data to the user who requested the search.

Figure 3:
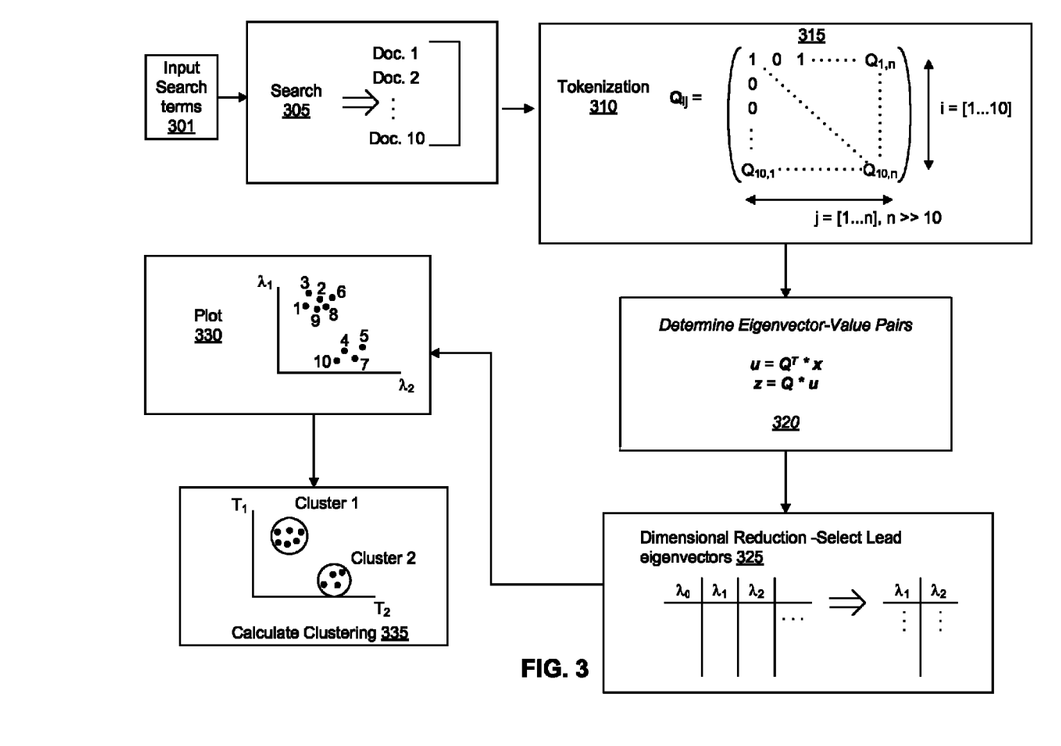
FIG. 3 is an exemplary application of the system depicted in FIG. 1.

FIG. 3 is an exemplary application of the system depicted in FIG. 1. The user may be, for example, attempting to find information about Jack Smith, a potential renter for the user's apartment. Another potential scenario is that the user is Jack Smith, and the user is attempting to determine what electronic information may potentially be associated with his name. The user may have available to him known information about Jack Smith, e.g., the name Jack Smith, his occupation as an engineer, that California is Jack Smith's state of residency, and that Jack Smith is an avid cyclist. In a step 301, a user accesses the identification system and enters search terms based on known information about the target of the search. The input module may then store the search terms in the data storage module and pass the search terms to a collector module.

In step 305, the collector module formulates search queries based on the search terms provided the user. In some embodiments, this may include adding related terms to the initial information provided by the user. For example, including the term "bicycle" in addition to the search term "cycling." The collector module then sends out the queries to various data sources (e.g., search engines, private databases, criminal databases, etc.) For example, one query may be a GOOGLE search of "Jack Smith and cycling." The results from the various queries are then collected. In the present example, 10 different documents are returned based on the search results. Each of the documents mention one or more terms. It should be noted that the search may occur over unstructured data.

In step 310, the search results are tokenized to create a data matrix $Q_{ij}^*$ ("Q"), where i references one of the 10 returned documents, i=[1 ... 10], and j references the occurrences of all words within the document, j=[1 ... n]. For example, the first document would correspond to the first row in the data matrix; the second document, the second row; and so on. In some embodiments, tokenization may occur by replacing the word with a numeric value. If the word matches a search term of interest, it is replaced with a "1." The more times a search word appears in the document the higher its token will be, for example, if the work "engineer" appears three times in the document, its value would be "3." If the word does not match the search term of interest it is replaced with a zero. For example, if "cycling" appears in the document twenty times, its token value would be "20," other words in the document that do not match any of the search terms of interest are replaced with a "0." It should be noted that the number of words within a particular document may be large, such that n>>0. For example, n, may be on the order of 10,000 or more. Thus, the matrix Q may be quite large, and in this particular example the data matrix would be 10×10,000. Note that this is a relatively small example, as the number of documents may also be very large e.g., tens of thousands of documents or more.

In step 320, the eigenvector-value pairs are determined for a matrix S, where the S matrix is determined by multiplying the Q matrix by its transpose, $Q^T$. It should be noted that in this example the S matrix is a 10×10 matrix (occurs because the data matrix is being multiplied by its transpose). Performing data operations on large matrices (e.g., Q) can take large amounts of system resources and in some cases may not be feasible due to the size of the data set.

In some embodiments, to reduce the load on the system resources, a guess eigenvector can be used. A guess eigenvector, x, is first multiplied with matrix $Q^T$, resulting in a vector u. Then the vector u is multiplied with the Q matrix, and the eigenvector-value pairs are determined via standard iterative methods. The resulting operation will lead to convergence of the eigenvector solution.

In step 325, dimensional reduction occurs as the lead eigenvectors are selected. The approach described in step 325 uses the Meila-Shi algorithm, however, other approaches may also be used (see below). First, the calculated eigenvalues are sorted from highest to lowest. Using the Meila-Shi method, the lead eigenvalue is 1 and corresponds to the background and may be discarded. The background information pertains to tokens corresponding to less useful information, e.g., "the," "a," "which," "that," "an," etc. Additionally, the eigenvectors whose corresponding eigenvalues are below a threshold setting may also be discarded. In contrast, for example, search terms "engineer" or "bicycle" may occur more than other search terms in the these ten documents, resulting in the eigenvalues above the threshold. Additionally, in some embodiments, the threshold may be determined or modified by the user. In exemplary FIG. 3, the threshold is set such that only eigenvectors $\lambda_1$ and $\lambda_2$ are selected.

It should be noted that each document may be represented as a linear combination of eigenvectors. As seen in step 330, eigenvectors $\lambda_1$ and $\lambda_2$ may be plotted against each other, with the plotted points, 1 ... 10, corresponding to the documents 1 ... 10. Plotting at this stage is not a mandatory, and is depicted to help illustrate the described process.

In step 335, the selected eigenvector value pairs are passed to the quantum clustering module for determining potential minimas (clusters). In some embodiments, the quantum clustering module uses the Schrödinger Wave Equation to determine the potential minima. In some embodiments, the quantum clustering module may use a statistical partition function to determine the potential minima. The tightness of the clusters are scaled via a variance value. This variance value may be determined by the system or by the user. As depicted in FIG. 3, two distinct clusters are formed. These clusters may indicate that the documents within those clusters are related to the same individual. Some of the documents in cluster 1 may be, for example, a press release that Jack Smith won a local cycling event, a LINKEDIN profile for an engineer Jack Smith who works in California, and a biography for a Jack Smith on a California company's website. Some of the documents in cluster 2 may be, for example, a police record for a Jack Smith in Washington state for stealing a bicycle, a newspaper article about a Jack Smith who is being prosecuted for bicycle theft, etc. It should be noted that the clusters may actually both relate to the same Jack Smith, but different aspects of his life. For example, cluster 1 may contain documents pertaining to Jack Smith's career as an engineer, and cluster 2 may contain documents pertaining to Jack Smith's hobby as a cyclist.

These results may then be provided to the user or the API developer. If there are only two or 3 eigenvectors after the lead eigenvectors are selected in step 325, the results may be graphically displayed to the user. Detailed embodiments of the process discussed above are described with respect to FIGS. 4, 5, and 6.

Figure 4:
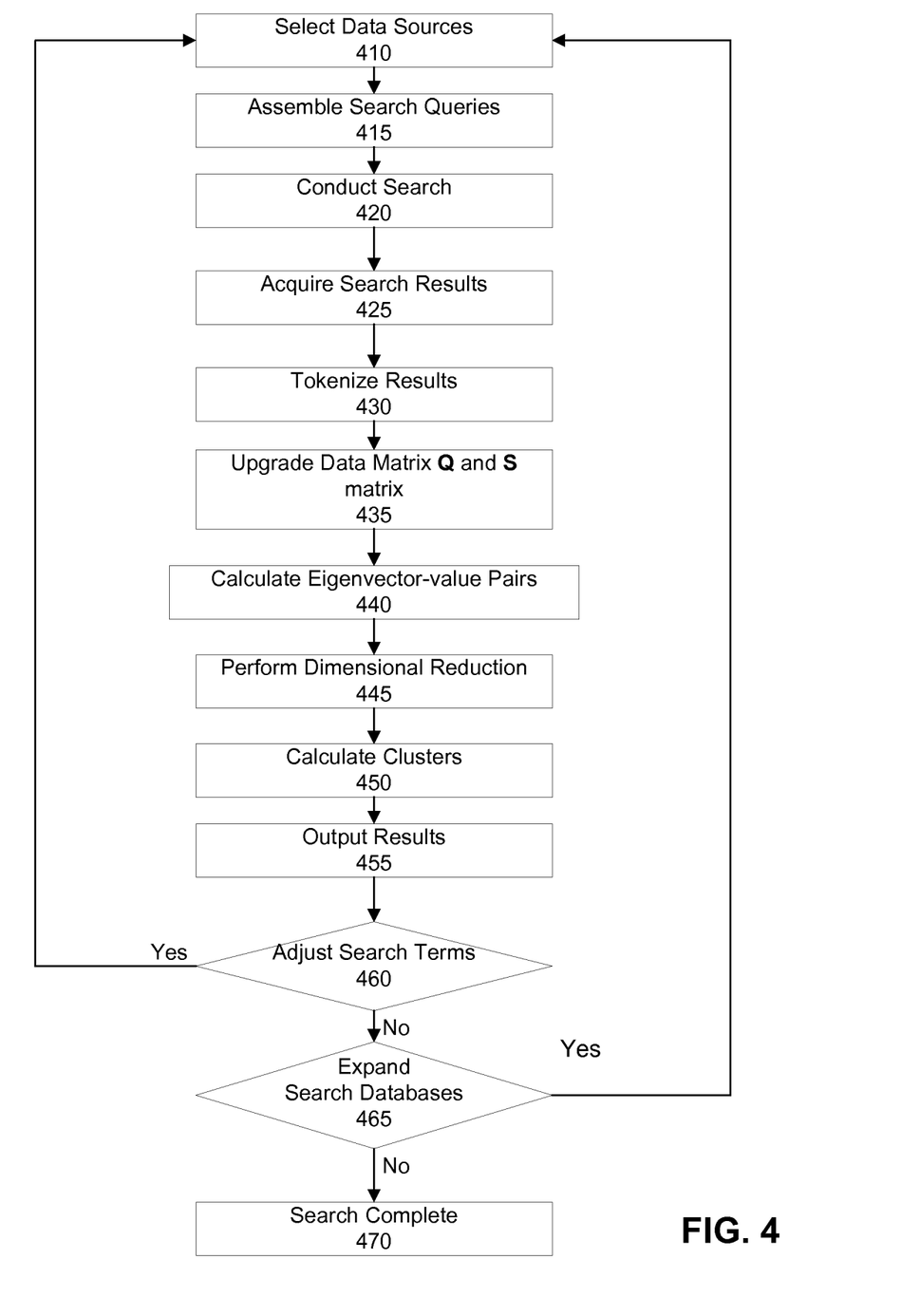
FIG. 4 is a flowchart representing an exemplary method for finding and processing information relating to a set of search terms.

FIG. 4 is a flowchart representing an exemplary method for finding and processing information relating to a set of search terms. In some embodiments, the search terms may not relate to the user, but to some other entity. The identification system can receive the set of search terms from the user or through web crawling or spidering. For example, the search terms may include the entity name (e.g., the first and last name of a person or the full name of a company), and one or more other biographical, geographical, or other terms about the entity. In some embodiments, the search terms used may be determined by first searching, in a publicly available database or search engine, a private search engine, or any other appropriate data resource, on the user's name or other search terms, looking for the most frequently occurring phrases or terms in the result set, and presenting these phrases and terms to the user. The user may then select which of the resultant phrases and terms to use in constructing the query.

In step 410, the identification system selects which data sources will be queried in the search process. For example, the identification system can select categories where the search may be performed, e.g., private party websites, company websites, cached information stored in a search database (such as those maintained at Google™ or Yahoo™), criminal databases, a credit agency data source, an insurance database, etc. Additionally, in some embodiments, a price for performing the search may be associated with the number of data sources queried. In some embodiments, the collector module may identify the data sources to be searched independent of the user.

In step 415, the identification system prepares one or more search queries based on information known to relate to the user. In some embodiments, the identification system parses the search terms to identify key search terms and remove stop words (e.g., the, which, is, at, on, etc.). Additionally, in some embodiments the terms related to the search terms may be identified and added to the list of terms used to form search queries. For example, if a search term is red, a related term, violet, may be added to the search query. Alternatively, in some embodiments, only search terms entered by the user are utilized to formulate search queries. The search terms of interest are then formulated into search queries that may be used to queries the data sources to be searched. In some embodiments, a collector module may perform step 415.

In step 420, the information system may use the assembled search queries in order to find information about the user from the selected data sources. The searches may be performed using search terms that are generated based on information provided by user. For example, if the user provides home town, city of residence, and alma mater, then these items may be used alone or in conjunction as search terms. The search may be performed automatically based on the data provided from user, through a web crawler or spider, or may be performed by a human agent based on the information provided from user. The query is submitted to selected data sources. The query may be submitted as Hypertext Transfer Protocol (HTTP) POST or GET mechanism, hypertext markup language (HTML), extensible markup language (XML), structured query language (SQL), plain text, Google Base, as terms structured with Boolean operators, or in any appropriate format using any appropriate query or natural language interface. The query may be submitted via the Internet, an intranet, or via any other appropriate coupling to a query processing engine associated with or contained within any of the data sources. The searches may be performed via "screen scraping" on a publicly available search engine, such as Google search or Yahoo search, or private search engines, such as Westlaw search or LexisNexis search. Searches may also be performed via a searching application program interface (API) or structured data exchange (such as eXtensible Markup Language). In some embodiments, a collector module may perform step 420. Acquired search results in step 425 may be stored in a data storage module.

After the search results are acquired in step 425, the identification system tokenizes the results in step 430. For example, the search may return 100 different documents, where each document contains at least one search term of interest. In step 430, the identification system beginning with the first document, identifies all of the text in the document not corresponding to a search term of interest and assigns each term a numeric value of "0," and those terms that do match a search term of interest and appear a 'w' number of times, are assigned a token value of 'w.' For example, if the search term of interest appears 10 times, its token value is "10." The identification system repeats this process for every document returned in step 425. The result being a tokenized data matrix $Q_{ij}$ ("Q"), as depicted in exemplary FIG. 5, where i references one of the k returned documents, i=[1 ... k], and j references the occurrences of all words within the document, j=[1 ... n]. In some embodiments, the identification system then stores the matrix Q in the data storage module. In some embodiments a tokenization module may perform the step 430

In step 435, any upgrades are added to the matrix Q, and the matrix S (discussed below) by the identification system. For example, if additional data sources are searched, any documents resulting from that search may be tokenized and added to the matrix Q. In some embodiments, if no search was previously conducted, the S matrix may not have been calculated. Accordingly, the S matrix would not need to be updated. If, however, there is an existing S matrix, the identification system may be configured to update the S matrix if additional search results were added to the Q matrix. In some embodiments, a data processing module performs the step 435.

In step 440 the identification system calculates the eigenvector-value pairs for the matrix S, which equals:

$$S = Q * Q^T$$

where the matrix $Q^T$ is the transpose of the matrix Q. It should be noted that in this example the S matrix is a k×k matrix, which is much smaller than the data matrix Q, where Q is a k×n matrix, where n>>k. The S matrix may be much denser (more non-zero entries) that the Q matrix, however, in some embodiments, S may be calculated outright by the data processing module. However, Q and $Q^T$ can be very large matrices, which can make it infeasible to load them into memory. In situations where it is infeasible, in some embodiments, the identification system may be configured to identify the eigenvector-value pairs through the following process. In some embodiments, the data processing module within the identification system performs the step 440.

First, the identification system creates a guess eigenvector, x, with a corresponding eigenvalue, $\lambda$. Data processing module may then multiply the eigenvector x with the matrix $Q^T$, resulting in a vector u. Then the vector u is multiplied with the Q matrix.

$$u = Q^T * x$$

$$z = Q * u$$

Then the eigenvector-value pairs are determined via standard iterative methods. There are many methods which may be used, e.g., Arnoldi, Lanczos, Conjugate gradient, GMRES (generalized minimum residual), BiCGSTAB (biconjugate gradient stabilized), QMR (quasi minimal residual), TFQMR (transpose-free QMR), MINRES (minimal residual), and Jacobi-Davidson. The resulting eigenvector-value pair may then be used in an iterative process to be the subsequent guess eigenvector. This operation, applied in an iterative manner will converge to the eigenvector solution.

Figure 6:
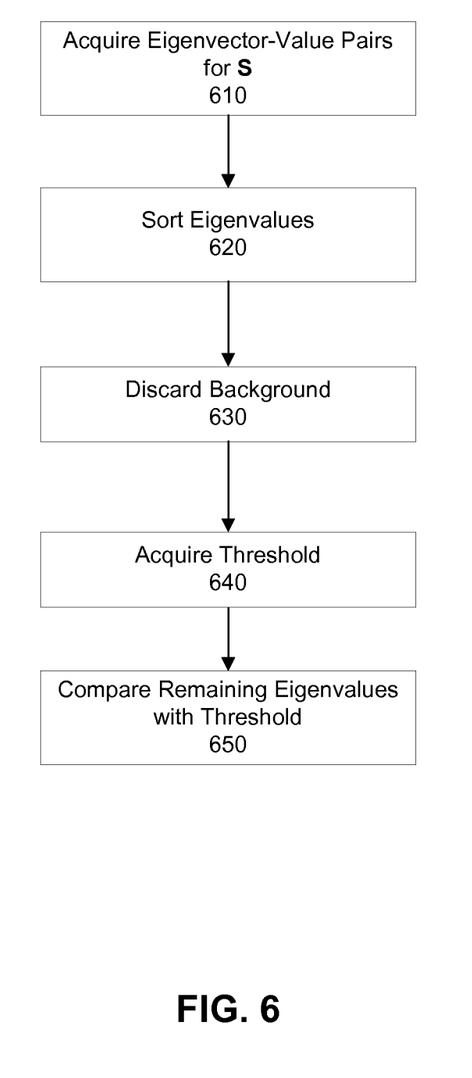
FIG. 6 is a flowchart representing an exemplary method for dimensional reduction.

In step 445, the identification system performs dimensional reduction, reducing the amount of eigenvectors that will be processed by the quantum clustering module. The identification system selects the lead eigenvectors that will be processed by the quantum clustering module. FIG. 6 is a flowchart representing an exemplary method for dimensional reduction using the Meila-Shi algorithm. In step 610, the identification system acquires the eigenvector-value pairs from the data processing module. In step 620, the identification system sorts the acquired eigenvalues from highest to lowest. One advantage of the Meila-Shi algorithm is that the sorting process may identify which eigenvector-value pairs correspond to background terms and which eigenvector-value pairs correspond to nonbackground terms. In step 630, the data processing module discards the eigenvector $\lambda_0$, which may correspond to background terms.

In step 640, the identification system acquires a threshold. In some embodiments the threshold may be set by the identification system independent of the user. In other embodiments, the threshold may be set by the user. In some embodiments the threshold may be set by another module. Additionally, in some embodiments the threshold may be set by a human operator other than the user.

In step 650, the identification system compares the set of eigenvalues with the threshold. If an eigenvalue is below the threshold, the eigenvalue and its corresponding eigenvector are discarded. The eigenvectors whose eigenvalues are above the threshold are the lead eigenvectors. In some embodiments steps 610, 620, 630, 640, and 650 may be performed by a dimensional reduction module. In some embodiments (not shown), a singular value decomposition ("SVD") method may be used for dimensional reduction in lieu of the Meila-Shi algorithm.

Figure 7:
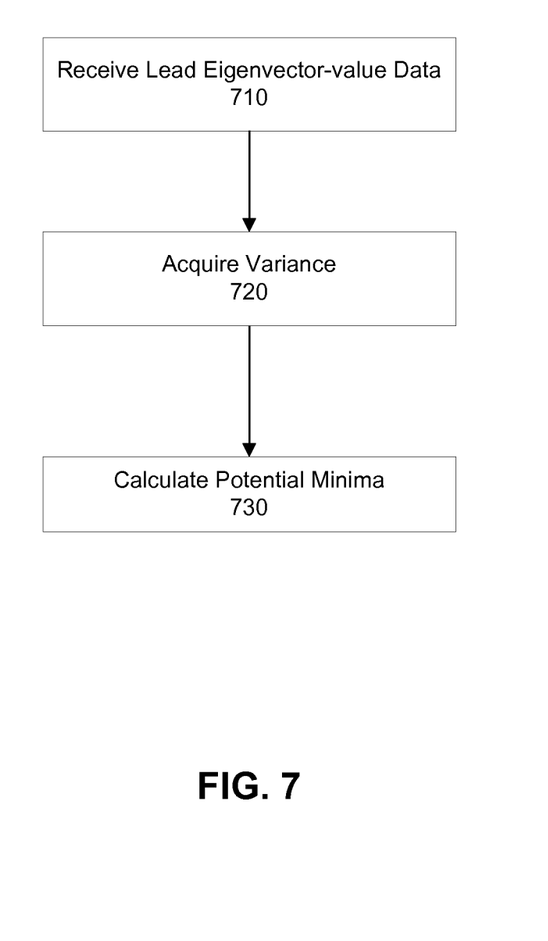
FIG. 7 is a flowchart representing an exemplary method for quantum clustering.

Returning to FIG. 4, in step 450 the identification system calculates clusters based on the received lead eigenvectors. Exemplary FIG. 7 illustrates an exemplary method for quantum clustering. In step 710, the identification system receives the lead eigenvector-value data outputted by the dimensional reduction module. In step 720, the quantum clustering module acquires the variance, $\sigma$. The value of the variance will affect the number of clusters identified. A low variance value determines internal clusters, whereas a high variance value results in fewer clusters. In some embodiments, the variance may be determined by the identification system independent of the user. In other embodiments, it may be set by the user. In some embodiments, it may be set by another module. In some embodiments, the variance may be set by a human operator other than the user.

Figure 8A:
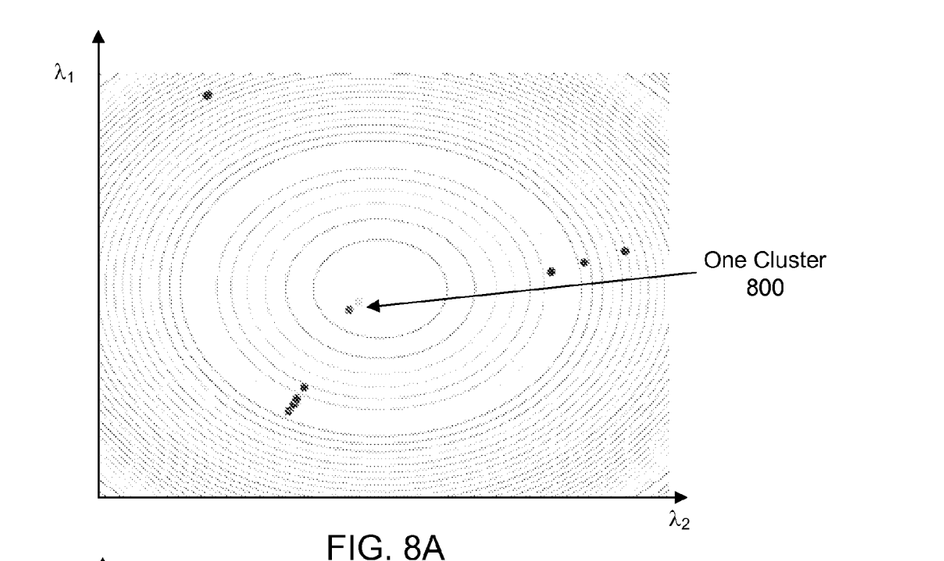
FIG. 8A is an example output of the quantum clustering module where the variance value is set high.
Figure 8B:
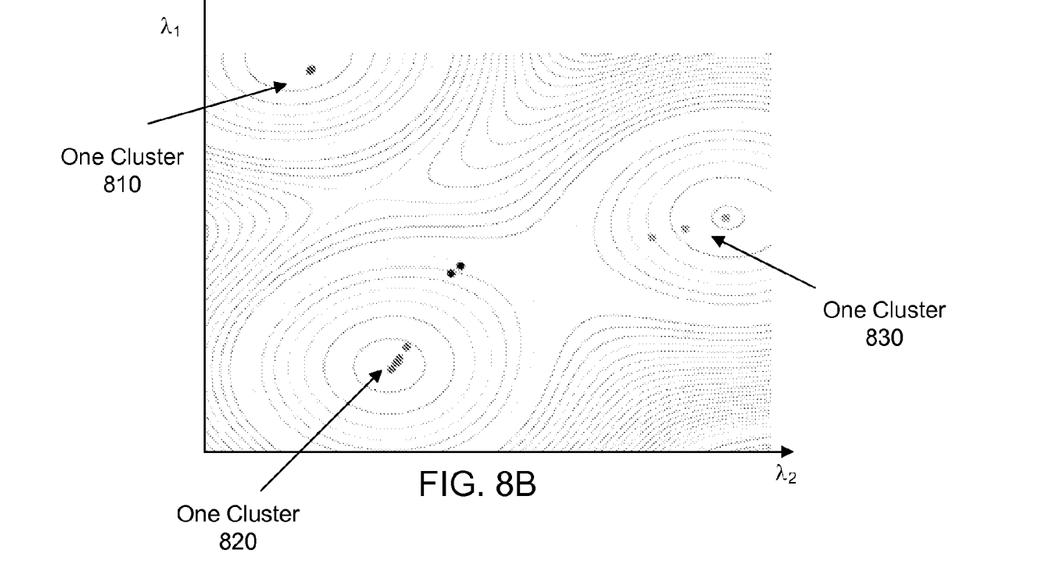
FIG. 8B is an example output of the quantum clustering module where the variance value is set low.

In step 730, the potential minima is calculated, for example, using a rescaled version of the Schrödinger Wave Equation:

$$\hat{H}\psi = (\hat{T} + V)\psi$$

$$\hat{T} = -\frac{\sigma^2}{2}\nabla^2$$

$$V(\sigma, x) = \frac{1}{2\sigma^2} \sum_{i=1}^{N} (x - x_i)^2 p_i(\sigma, x)$$

where $p_i(\sigma, x)$ is a pill box function, $\psi$ is a wave function, $\nabla^2$ is a Laplace operator, $\sigma$ is the variance, x and $x_i$ are spatial vectors in k-space, $\hat{H}$ is the Hamiltonian operator, and V is the potential. The clustering module substitutes the received eigenvectors in for $x_i$, and then calculates the potential minima using $V(\sigma, x)$. For example, FIGS. 8A & 8B illustrate how potential minima may be displayed in on a 2-dimensional graph. It should be noted that the only difference between FIG. 8A and FIG. 8B is that the variance has a lower value in FIG. 8B. In FIG. 8A, one minima having one internal cluster 800 has been identified, while FIG. 8B illustrates three minima having internal clusters, 810, 820, and 830, within the dataset. In some embodiments steps 710, 720, and 730 may be performed by a quantum clustering module.

Returning to FIG. 4, in step 455, the identification system outputs the results. This output can be provided to the user or a developer residing at the identification system. Additionally, if the results contain less than four eigenvectors, the results may be graphically displayed to the user.

The user after reviewing the results may wish to continue the search. In step 460 the user may elect to adjust the search terms. The user may add additional terms to narrow the search, or may eliminate search terms to broaden the search.

Additionally, in step 465, the user may alter which data sources the search is configured to query. For example, the user may wish to add an additional data resource to those resources currently being queried. Likewise, the user may be able to subtract data sources from those to be queried. In some embodiments (not shown) step 465 is not present, because the user has no control over the data sources searched. In step 470, the search is complete because the user is satisfied with the provided search results.

Figure 9:
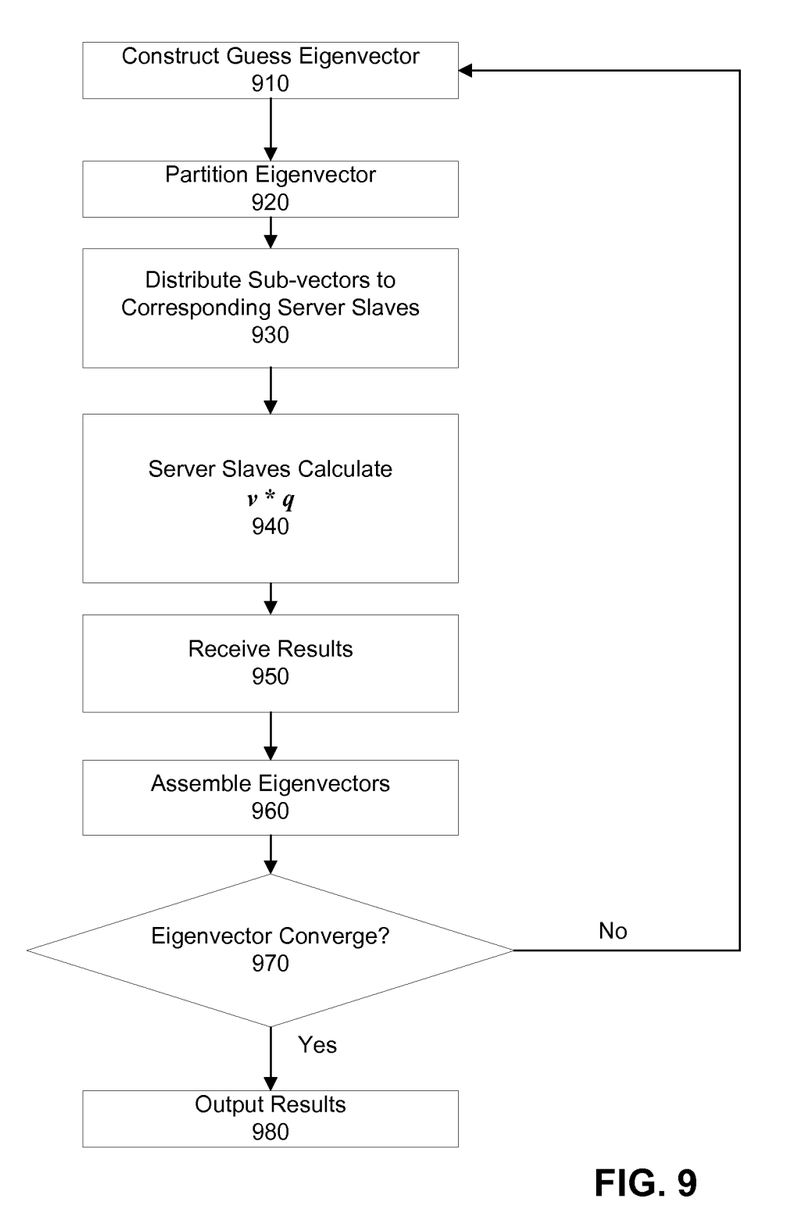
FIG. 9 is a flowchart representing an exemplary method for determining eigenvector-value pairs in a distributed network.

FIG. 9 is a flowchart representing an exemplary method for determining eigenvector-value pairs in a distributed network. In such a network, a number of server slaves are coupled to a central server. In some embodiments, the central server may be a data processing module. Some number, b, of the server slaves have portions of a Q matrix, q, spread across them.

In step 910, the data processing module may construct the initial guess eigenvector. The first initial eigenvector at the start of the program is a constant or random number normalized to unit length. For successive iterations including additions of documents and/or collecting data from a distributed network, the previous eigenvector is used as a starting guess for the new eigenvector.

In step 920, the data processing module may partition the eigenvector into some number of vectors, $v_1, v_2, \ldots v_b$, ("sub-vectors"). Where b equals the number of server slaves storing portions of the matrix Q.

In step 930, the data processing module then distributes sub-vector $v_1$ to server slave $SS_1$, distributes sub-vector $v_2$ to server slave $SS_2$, and so on until sub-vector $v_b$ is distributed to server slave $SS_b$. In some embodiments the data processing module may pass the sub-vectors, $v_1, v_2, \ldots v_b$, to some other module that distributes the vectors to the appropriate server slave.

In step 940, the server slave multiplies the received vector with the portion of the q matrix located on the server slave, e.g., $SS_1$ performs $v_1 * q_1$, $SS_2$ performs $v_2 * q_2$. Thus, the matrix-vector operation would occur on each server slave.

In step 950, the results of each matrix-vector operation are received from each server slave SS. In some embodiments, the data processing module receives the results. In some embodiments, the results may then be stored in a data storage module. In step 960, the data processing module may then assemble the resulting vectors to obtain a resulting re-constituted eigenvector.

In step 970, the data processing unit determines whether the assembled eigenvector has converged to the final eigenvector. If the assembled eigenvector has not converged, the assembled eigenvector is then used to construct a second guess eigenvector in step 910. Then steps 910-970 can continue in an iterative process until the assembled eigenvector converges to the final eigenvector. Convergence to the final eigenvector may be determined by many different methods, e.g., Arnoldi, Lanczos, Conjugate gradient, GMRES (generalized minimum residual), BiCGSTAB (biconjugate gradient stabilized), QMR (quasi minimal residual), TFQMR (transpose-free QMR), MINRES (minimal residual), and Jacobi-Davidson. Then the resulting eigenvector is outputted in step 980. In some embodiments, the results may then be outputted to a data storage module.

Other embodiments of the claimed inventions will be apparent to those skilled in the art from consideration of the specification and practice of the inventions disclosed herein. It is intended that the specification and examples be considered as exemplary only, with a true scope and spirit of the inventions being indicated by the following claims.

The invention claimed is:

1. A system for identifying information about a particular entity, comprising:
    a collector module configured to provide a request to one or more data sources using one or more search terms to acquire electronic documents having unstructured text, wherein the electronic documents are selected based on the one or more search terms from a plurality of terms related to the particular entity;
    a tokenizer module configured to tokenize the acquired documents to form a data matrix;
    a data processing module configured to calculate a plurality of eigenvectors, using the data matrix and the transpose of the data matrix;
    a quantum clustering module configured to:
        acquire a variance for determining the amount of intra-clustering between the documents, and
        cluster the acquired documents using some of the eigenvectors and the variance.

2. The system of claim 1, further comprising a dimensional reduction module configured to perform dimensional reduction on the calculated eigenvectors to obtain some nonbackground eigenvectors used for clustering.

3. The system of claim 1, wherein the quantum clustering module is configured to cluster the acquired documents using a designated quantum potential $V(\sigma, x)$, some eigenvectors, and the variance.

4. The system of claim 1, further comprising an output module configured to display the clustered documents if the eigenvectors used for clustering number are 3 or less.

5. The system of claim 1, wherein the data processing module is configured to:
    construct a guess eigenvector;
    multiply the guess eigenvector by the transpose of the data matrix to obtain a first vector;
    multiply the first vector with the data matrix to obtain a second vector; and
    provide the second vector if it is an eigenvector.

6. The system of claim 1, wherein the data processing module is configured to:
    construct a guess eigenvector to a distributed matrix, wherein the distributed matrix is related to the data matrix and the transpose of the data matrix;
    partition the guess eigenvector into one or more sub-vectors;
    distribute the one or more sub-vectors to one or more server slaves that contain at least one tokenized electronic document;
    acquire from the one or more server slaves, a second vector that corresponds to the multiplication of the sub-vector that was distributed to the server slave with the tokenized electronic document contained on that server slave;
    assemble the acquired vectors into a single reconstituted vector;
    determine whether the reconstituted vector is an eigenvector of the distributed matrix; and
    provide the reconstituted vector if it is an eigenvector of the distributed matrix.

7. The system of claim 1, wherein the quantum clustering module is configured to set the variance by a user, by a human operator other than a user, or from a data storage.

8. The system of claim 1, wherein the data matrix includes a plurality of numeric values, wherein the plurality of numeric values includes a first numeric value representing terms not associated with the one or more search terms.

9. The system of claim 8, wherein the plurality of numeric values includes a positive numeric value for each of the one or more search terms.

10. The system of claim 9, wherein the positive numeric value is based on the number of instances that a search term of the one or more search terms appears in an electronic document of the acquired documents.

11. The system of claim 8, wherein the first numeric value is zero.

12. A method for identifying information about a particular entity comprising:
   providing a request to one or more data sources using one or more search terms to acquire electronic documents having unstructured text, that are selected based on the one or more search terms from a plurality of terms related to the particular entity;
   tokenizing the acquired documents to form a data matrix;
   calculating a plurality of eigenvectors, using the data matrix and the transpose of the data matrix;
   acquiring a variance for determining the amount of intra-clustering between the documents; and
   clustering the acquired documents using some of the eigenvectors and the variance.

13. The method of claim 12, further comprising performing dimensional reduction on the calculated eigenvectors to obtain some nonbackground eigenvectors used for clustering.

14. The method of claim 12, wherein clustering the acquired documents is performed using a quantum potential $V(\sigma, x)$, some eigenvectors, and the variance.

15. The method of claim 12, further comprising displaying the clustered documents if the eigenvectors used for clustering number are 3 or less.

16. The method of claim 12, wherein calculating a plurality of eigenvectors, using the data matrix and the transpose of the data matrix comprises:
   constructing a guess eigenvector;
   multiplying the guess eigenvector by the transpose of the data matrix to obtain a first vector;
   multiplying the guess eigenvector by the transpose of the data matrix to obtain a first vector;
   multiplying the first vector with the data matrix to obtain a second vector; and
   providing the second vector if it is an eigenvector.

17. The method of claim 12, wherein calculating a plurality of eigenvectors, using the data matrix and the transpose of the data matrix comprises:
   constructing a guess eigenvector to a distributed matrix, wherein the distributed matrix is related to the data matrix and the transpose of the data matrix;
   partitioning the guess eigenvector into one or more sub-vectors;
   distributing the one or more sub-vectors to one or more server slaves that contain at least one tokenized electronic document;
   acquiring from the one or more server slaves, a second vector that corresponds to the multiplication of the sub-vector that was distributed to the server slave with the tokenized electronic document contained on that server slave;
   assembling the acquired vectors into a single reconstituted vector;
   determining whether the reconstituted vector is an eigenvector of the distributed matrix; and
   providing the reconstituted vector if it is an eigenvector of the distributed matrix.

18. The method of claim 12, wherein the variance is set by a user, by a human operator other than a user, or from a data storage.

19. The method of claim 12, wherein the acquired electronic documents are provided by one or more public data sources.

20. A non-transitory computer-readable medium comprising program code, the program code being operable, when executed by a computer system, to cause the computer system to perform a method for identifying information about a particular entity comprising:
   providing a request to one or more data sources using one or more search terms to acquire electronic documents having unstructured text, that are selected based on the one or more search terms from a plurality of terms related to the particular entity;
   tokenizing the acquired documents to form a data matrix;
   calculating a plurality of eigenvectors, using the data matrix and the transpose of the data matrix;
   acquiring a variance for determining the amount of intra-clustering between the documents; and
   clustering the acquired documents using some of the eigenvectors and the variance.

21. The computer readable medium of claim 20, further comprising performing dimensional reduction on the calculated eigenvectors to obtain some nonbackground eigenvectors used for clustering.

22. The computer readable medium of claim 20, wherein clustering the acquired documents is performed by solving the Schrodinger Wave Equation, using some eigenvectors and the variance.

23. The computer readable medium of claim 20, further comprising displaying the clustered documents if the eigenvectors used for clustering number are 3 or less.

24. The computer readable medium of claim 20, wherein calculating a plurality of eigenvectors, using the data matrix and the transpose of the data matrix comprises:
   constructing a guess eigenvector;
   multiplying the guess eigenvector by the transpose of the data matrix to obtain a first vector;
   multiplying the guess eigenvector by the transpose of the data matrix to obtain a first vector;
   multiplying the first vector with the data matrix to obtain a second vector; and
   providing the second vector if it is an eigenvector.

25. The computer readable medium of claim 20, wherein calculating a plurality of eigenvectors, using the data matrix and the transpose of the data matrix comprises:
   constructing a guess eigenvector to a distributed matrix, wherein the distributed matrix is related to the data matrix and the transpose of the data matrix;
   partitioning the guess eigenvector into one or more sub-vectors;
   distributing the one or more sub-vectors to one or more server slaves that contain at least one tokenized electronic document;
   acquiring from the one or more server slaves, a second vector that corresponds to the multiplication of the sub-vector that was distributed to the server slave with the tokenized electronic document contained on that server slave;
   assembling the acquired vectors into a single reconstituted vector;
   determining whether the reconstituted vector is an eigenvector of the distributed matrix; and
   providing the reconstituted vector if it is an eigenvector of the distributed matrix.

26. The computer readable medium of claim 20, wherein the variance is set by a user, by a human operator other than a user, or from a data storage.

27. The computer readable medium of claim 20, wherein the acquired electronic documents are provided by one or more public data sources.

* * * * *